US007873170B2

(12) United States Patent
Chang et al.

(10) Patent No.: US 7,873,170 B2
(45) Date of Patent: Jan. 18, 2011

(54) MAINTAINING KEYS REMOVED FROM A KEYSTORE IN AN INACTIVE KEY REPOSITORY

(75) Inventors: Shannon Hsinhen Chang, Vail, AZ (US); Khanh Vi Ngo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 11/683,947

(22) Filed: Mar. 8, 2007

(65) Prior Publication Data

US 2008/0219453 A1  Sep. 11, 2008

(51) Int. Cl.
*H04L 9/08* (2006.01)
(52) U.S. Cl. .......................................... 380/286; 380/44
(58) Field of Classification Search .................. 380/286, 380/44
See application file for complete search history.

(56) References Cited

U.S. PATENT DOCUMENTS

| 5,956,407 | A | | 9/1999 | Slavin |
| 5,974,151 | A | | 10/1999 | Slavin |
| 6,044,155 | A | * | 3/2000 | Thomlinson et al. ........ 713/155 |
| 6,629,102 | B1 | | 9/2003 | Malloy et al. |
| 6,901,512 | B2 | | 5/2005 | Kurn et al. |
| 6,920,563 | B2 | | 7/2005 | Kohl et al. |
| 7,590,845 | B2 | | 9/2009 | Ball et al. |
| 2005/0216773 | A1 | | 9/2005 | Mitchell et al. |

FOREIGN PATENT DOCUMENTS

CN  1638325 A  7/2005

OTHER PUBLICATIONS

Zhong, "A Practical Key Management Scheme for Access Control in a User Hierarchy", Computers & Security, vol. 21, No. 8, pp. 750-759, 2002.

(Continued)

*Primary Examiner*—Ian Moore
*Assistant Examiner*—Brian Shaw
(74) *Attorney, Agent, or Firm*—David W. Victor; Konrad Raynes & Victor LLP

(57) ABSTRACT

Provided are a method, system, and article of manufacture for maintaining keys removed from a keystore in an inactive key repository. A keystore includes active keys, wherein at least one active key in the keystore is associated with at least one storage device and available for encrypting and decrypting data with respect to the associated storage device. A request is received for an operation with respect to a specified active key that causes the specified active key to be removed as an active key from the keystore. The specified active key is indicated as inactive, wherein keys indicated as inactive are not available for use to encrypt and decrypt data. A request is received to restore one of the inactive keys to make available to decrypt and encrypt data for the at least one associated storage device associated with the requested inactive key. The requested inactive key to restore is indicated as active in the keystore, wherein the restored key and any other active key in the keystore associated with the at least one storage device with which the restored key is associated are available to be provided to use to encrypt and decrypt data with respect to the at least one storage device with which they are associated.

14 Claims, 3 Drawing Sheets

OTHER PUBLICATIONS

Scheffczyk et al., "Managing Inconsistent Repositories via Prioritized Repairs", ACM, 2004, pp. 137-145.

McCown et al., "Evaluation of Crawling Policies for a Web-Repository Crawler", ACM, 2006, pp. 157-167.

Harrison et al., "Just-In-Time Recovery of Missing Web Pages", ACM, 2006, pp. 145-156.

Chinese Office Action dated Feb. 12, 2010 for Chinese Application No. 2008100822477.

English Abstract of Chinese Application No. CN1638325A.

* cited by examiner

MAINTAINING KEYS REMOVED FROM A KEYSTORE IN AN INACTIVE KEY REPOSITORY

BACKGROUND OF THE INVENTION

1. Field of the Invention

The present invention relates to a method, system, and article of manufacture for maintaining keys removed from a keystore in an inactive key repository.

2. Description of the Related Art

Data stored on removable tape cartridges may be encrypted by an encryption engine to protect the data. Data encryption is especially useful for businesses that store personal data on their customers. Recent government regulations place requirements and legal obligations on companies storing personal data to report missing data or prevent the data from being stolen.

One concern with encrypting data on a tape cartridge is maintaining and managing copies of encryption keys for numerous tape cartridges encrypted with different encryption keys. In the current art, a key manager in communication with the tape drive may manage keys in a keystore, comprising a database or other data structure to associate encryption keys with tape drives that use the associated keys to encrypt data and/or storage cartridges whose data was encrypted with the associated encryption key.

Keys may be expired or removed from the keystore. An expired key may be replaced with a new key to use to encrypt and decrypt as part of a security policy. Once a key is expired or removed from the keystore, that key is no longer available to be used to encrypt and decrypt data. Data on tape cartridges that remains encrypted with the expired or deleted key cannot be recovered from the cartridge encrypted with the expired key.

There is a need in the art for improved techniques for managing expired and active encryption keys for removable storage media, such as tape cartridges.

SUMMARY

Provided are a method, system, and article of manufacture for maintaining keys removed from a keystore in an inactive key repository. A keystore includes active keys, wherein at least one active key in the keystore is associated with at least one storage device and available for encrypting and decrypting data with respect to the associated storage device. A request is received for an operation with respect to a specified active key that causes the specified active key to be removed as an active key from the keystore. The specified active key is indicated as inactive, wherein keys indicated as inactive are not available for use to encrypt and decrypt data. A request is received to restore one of the inactive keys to make available to decrypt and encrypt data for the at least one associated storage device associated with the requested inactive key. The requested inactive key to restore is indicated as active in the keystore, wherein the restored key and any other active key in the keystore associated with the at least one storage device with which the restored key is associated are available to be provided to use to encrypt and decrypt data with respect to the at least one storage device with which they are associated.

DETAILED DESCRIPTION

Figure 1:
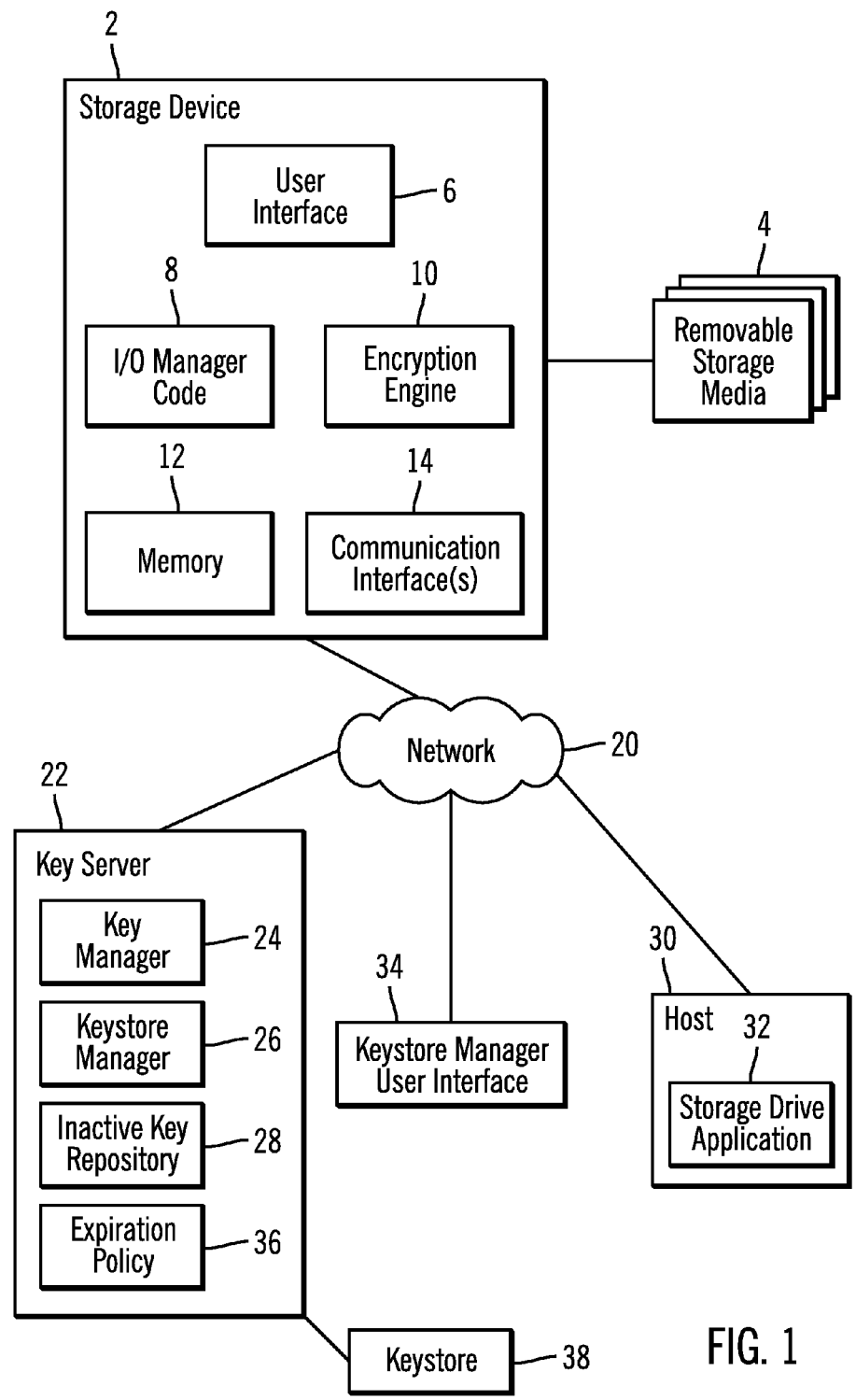
FIG. 1 illustrates an embodiment of a computing environment including a storage drive.

FIG. 1 illustrates an embodiment of a storage computing environment including a storage drive 2, which may comprise a removable storage drive, for interfacing with a removable storage media 4. The storage drive 2 may include a user interface 6 comprising one or more buttons or keys for interacting with the storage drive 2. The user interface 6 may include an eject button for manually unloading removable media; up/down buttons for navigating a list of items, enter/exit buttons for selecting items or exiting from a menu or list; one or more status displays, such as a light or LED (Light Emitting Diode), a numeric display, and alphanumeric display, etc. Additionally, a user interface may be presented to the storage device 2 on a connected computer system. The storage drive 2 includes I/O manager code 8 to perform read/write operations with respect to the coupled removable storage media 4, an encryption engine 10, and a memory 12, such as a Flash Memory, Electronically Erasable Programmable Read Only Memory (EEPROM), battery backed up Random Access Memory (RAM), etc. The memory 12 may store I/O data and configuration information used to read and write data to the coupled removable storage media 4. The I/O manager code 8 may use the encryption engine 10, which performs operations to encrypt and decrypt data on a coupled removable storage media 4 using one or more encryption keys. In certain embodiments, the encryption keys are buffered in the encryption engine 10. The encryption engine 10 may use one or more encryption algorithms, which may include, but are not limited to, DES (Data Encryption Standard), AES (Advanced Encryption Standard), RSA (Rivest Shamir Adleman), and other suitable encryption algorithms known in the art.

The removable storage media 4 may comprise a cartridge referred to as a data storage media cartridge. An example of a data storage media cartridge that is widely employed in removable automated data storage libraries for mass data storage is a magnetic tape cartridge. The removable storage media 4 may include a storage media comprising any type of suitable media on which data may be stored and which may serve as removable media, including but not limited to magnetic media (such as magnetic tape or disks), optical media (such as optical tape or disks), electronic media (such as PROM, EEPROM, flash PROM, MRAM, CompactFlash™, Smartmedia™, Memory Stick™, etc.), or other suitable media.

The storage drive 2 includes one or more communication interfaces 14 to enable communication with different external devices, such as computer systems, a storage library, etc. There may be multiple interfaces for connecting to different devices or host computers. In addition, there may be redundant interfaces to improve reliability, availability, connectivity, or performance. In one embodiment, the interfaces 18 may comprise different interfaces and different communication protocols. The one or more communication interfaces 14 may comprise serial, parallel, or optical interfaces such as RS-232, USB (Universal Serial Bus), serial or parallel ATA (AT Attachment), SCSI (Small Computers System Interface), SAS (Serial Attached SCSI), Fibre Channel, IEEE 1394 (FireWire or iLink), IEEE 1284 (parallel port), etc. In addition, communication interface(s) 14 may comprise network or wireless interfaces such as Ethernet, CAN (Controller Area Network), 802.11 (Wi-Fi), X.25 (WAN), Bluetooth, etc. The communication interface(s) 14 may be used to provide commands and/or data to the storage drive 2.

In the embodiment of FIG. 1, communication interface 14 enables communication with a network 20 through which the storage drive 2 may communicate with a key server 22 including a key manager 24, a key storage manager 26, and an inactive key repository 28, and additional systems, such as host system 30. The key server 22 is in communication with a keystore 38, which may be coupled to the key server 22 or coupled to the network 20 or another component. The host system 30 may include a storage drive application 32 that communicates data and commands to the storage drive 2, such as a backup program, archival software, storage drive management program, or any other host application that is capable of sending read/write requests to the storage drive 2 for a coupled removable storage media. In an alternative embodiment, the communication interface(s) 14 may comprise a direct line connection to the key server 22 and/or host system 28.

The keystore 38 comprises a database of keys that the storage drives 2 may request to use to decrypt and encrypt data with respect to removable storage media 4. In one embodiment, one key may be associated with at least one storage device, such as a removable storage media 4 or storage drive 2, and used to encrypt and decrypt data with respect to at least one storage device (e.g. storage media 4 or storage drive 2) with which the key is associated. Keys removed from the keystore 38 are stored in the inactive key repository 28. Additionally, certain removed keys may not be archived in the inactive key repository 28. Further, the keystore 38 may maintain different types of keys, such as keys for different types of data. Further, one storage device, e.g., storage drive 4 or media 4, may utilize multiple keys. The key manager 24 may serve keys requested by storage drives 2 to use to encrypt and decrypt data in a removable storage media 4 loaded in or coupled to the storage drive 2. The keystore manager 26 may modify the keys.

A keystore manager user interface 34 comprises a program that may run on the key server 22 or another system that is used to perform administration operations with respect to the keystore manager 26, key manager 24, and inactive key repository 28. The keystore manager user interface 34 may interact with the keystore manager 26 to control the keystore manager 26 to modify, add and delete keys from the keystore 38. The keystore manager user interface 34 may originate commands to delete or expire a key from the keystore 38 or generate a replacement key for an active key in the keystore 38. A deleted, expired or replaced key is removed from the keystore 38 and added to the inactive key repository 28, either automatically or manually through the keystore manager user interface 34. The keystore manager user interface 34 may further be used to create one or more expiration policies 36, which are used to determine when keys in the inactive key repository 28 may be permanently deleted. The expiration policy 36 may specify a condition, such as the age of an inactive key in the inactive key repository 28, how long the key has been in the inactive key repository 28, a number of different versions of a key to keep, etc., where keys are deleted from the inactive key repository 28 when they satisfy the specified condition.

Figure 2:
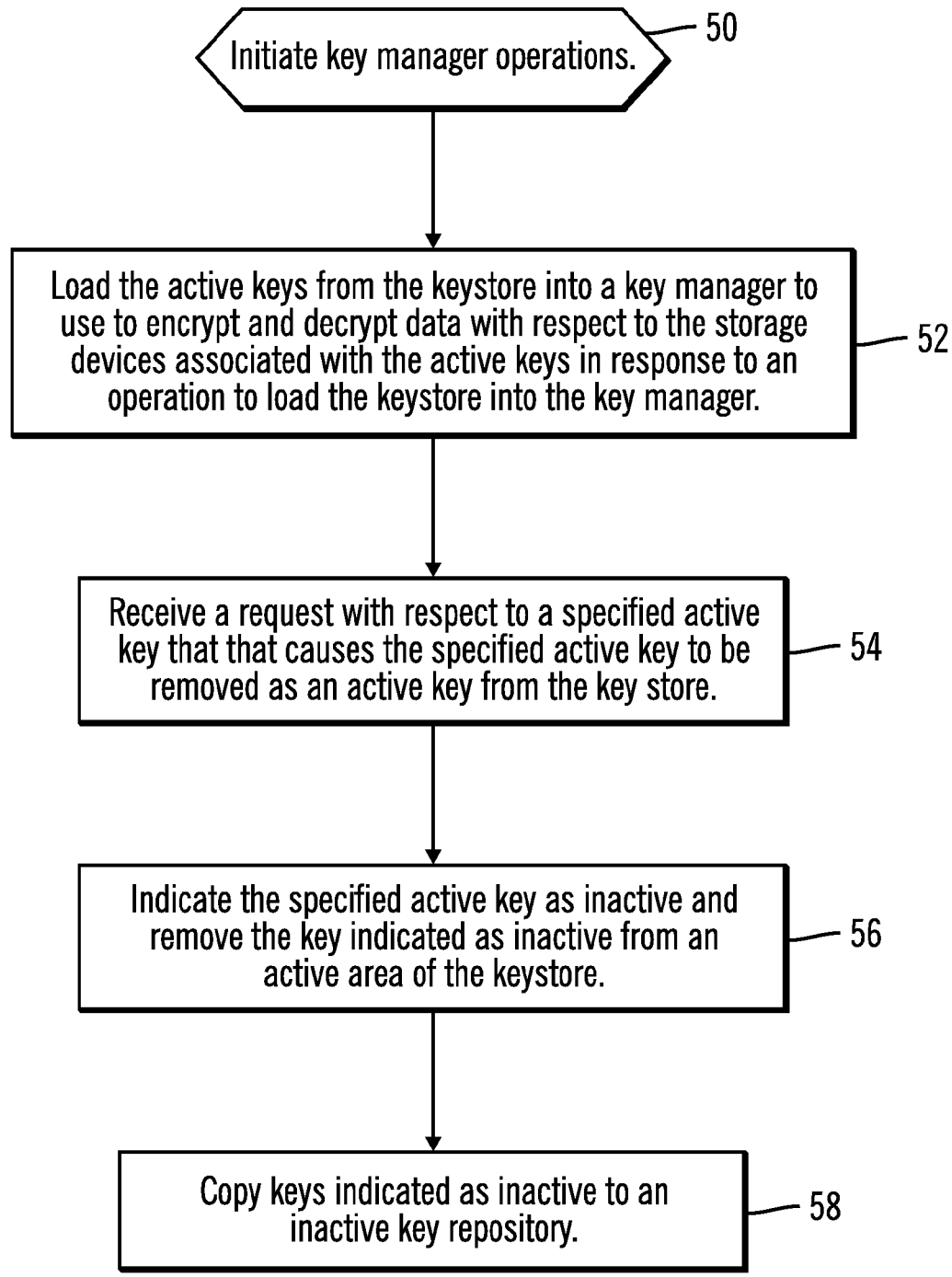
FIG. 2 illustrates an embodiment of key management operations.

FIG. 2 illustrates an embodiment of operations performed by the keystore manager user interface 34 and/or keystore manager 26 to remove a key from the keystore 38. Upon initiating (at block 50) key management operations, the keystore manager 26 may load (at block 52) some or all of the active keys from the keystore 38 into the active memory of the key manager 24 in response to an operation to load the keystore 38 into the key manager 24. In one embodiment, the keystore manager user interface 34 may issue a command to load the keys from a keystore 38 into the key manager 24 to use. Further, the key manager 24 may only load keys from the keystore 38 as they are requested or needed. The key manager 24 may further load keys from multiple keystores. The keystore manager user interface 34 may select from multiple keystores 26 to load into the key manager 24. Alternatively, the command to initiate the load operation may originate from the key manager 24. The key manager 24 may then serve the loaded keys to the storage drives 2 to use to encrypt and decrypt data with respect to the storage devices, e.g., removable storage media 4 and/or storage drives 2, associated with the active keys.

Upon the keystore manager 26 receiving (at block 54) a request with respect to a specified active key in the key manager 24 that causes the specified active key to be removed as an active key from the keystore, the keystore manager 26 indicates (at block 56) the specified active key as inactive and removes the key indicated as inactive from an active area of the keystore 38. The keystore manager 26 may further copy (at block 58) keys indicated as inactive to the inactive key repository 28. The request causing a specified active key to be removed from the keystore 38 may comprise a request from the keystore manager 26 or user interface 34 to delete or expire an active key. Additionally, in response to the keystore manager 26 or keystore manager user interface 34, the request causing the specified active key to be removed may comprise the generation of a new key by the keystore manager user interface 34 or keystore manager 26 to replace a currently used active key as part of general key management security operations. Further requested operations may also cause an active key to be rendered inactive and removed from the key manager 24 and added to the inactive keystore repository 28. Yet further, an entire keystore 38 may be rendered inactive, as a result of deleting or expiring all the keys in the keystore 38, updating all the keys in a keystore 38 with new keys or some other operation. In such event, the entire keystore 38 rendered inactive may be removed from the key manager 24 and stored in the inactive key repository 28.

Keys placed in the inactive key repository 28 are not available to the key manager 24 to provide to a storage drive 2 to use to decrypt and encrypt data with respect to an associated storage device in response to a request from the storage drive 2 for a key. Further, the key manager 24 or keystore 38 code may not permit the export of keys from the inactive key repository 28 to an external location.

Figure 3:
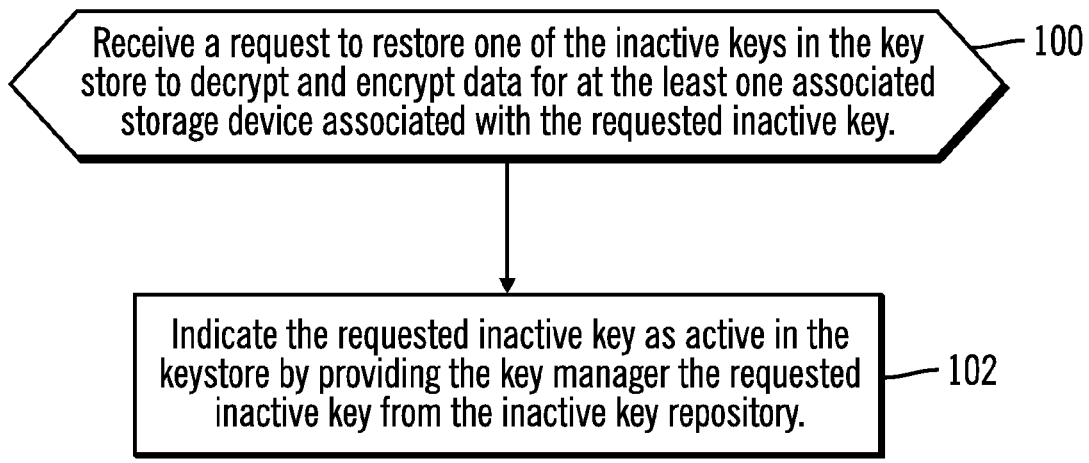
FIG. 3 illustrates an embodiment of operations to restore a key removed from a keystore.

FIG. 3 illustrates an embodiment of operations performed by the key manager 24 in response to receiving (at block 100) a request to restore one of the inactive keys in the inactive key repository 28 to make available to decrypt and encrypt data for at the least one associated storage device associated with the requested inactive key. This restore request may be initiated by the keystore manager user interface 34 or by the keystore manager 26. An administrator may initiate the request to restore the key upon determining that an inactive key is needed for a removable storage media 4. In response to the restore request, the key manager 24 indicates (at block 102) the requested inactive key as active in the keystore 38 by providing the key manager 24 the requested inactive key from the inactive key repository 28. The key manager 24 may then include the restored key in the active area where it is available to provide to storage devices 2.

In further embodiments, when restoring a key, if two keys have the same alias (whether the keys are the same or not) the user may configure the keystore 38 set in one of two ways—automatically overwrite the older key with the restored key, automatically fail-out indicating replications, or prompt the user for action and indicate the duplicate alias.

Figure 4:
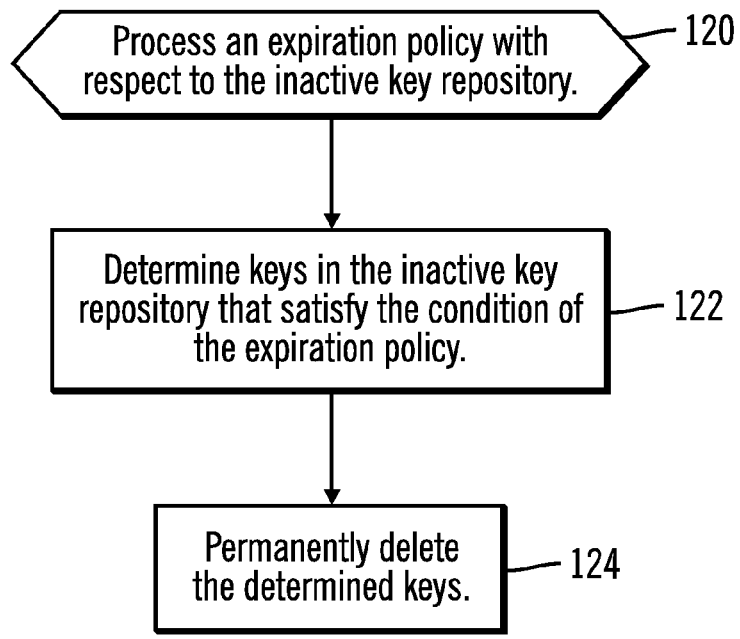
FIG. 4 illustrates an embodiment of operations to apply an expiration policy to an inactive key repository.

FIG. 4 illustrates an embodiment of operations performed by the key manager 24 in response to processing (at block 120) an expiration policy 36 defined for the inactive key repository 28. The expiration policy 36 defines one or more conditions with respect to keys in the inactive key repository 28. The conditions may specify a duration for expiring keys that have been in the repository at least for the specified duration or keys associated with a time exceeding a specified duration, such as keys that were created or last used past the indicated time. The conditions may also concern the space used by the inactive key repository 28, such that keys are deleted on a first-in-first-out (FIFO) basis if the repository 28 reaches a space limit or concern the version of the keys, such that keys beyond a most recent or other version are deleted. The key manager 24 determines (at block 122) keys in the inactive key repository 28 that satisfy the condition of the expiration policy 36 and permanently deletes (at block 124) the determined keys.

With the described embodiments, keys that are removed from the keystore 38 are maintained in an inactive key repository 28 from which they may be restored for later use by the key manager 24 to provide to storage drives to use for encryption and decryption purposes. For instance, if the key manager 24 creates a new key for storage media 4, but not all the storage media 4 are updated to have their data encrypted with the new key, the older key replaced by the newer key may be restored from the inactive key repository 28 for use to recover data from a storage media 4 whose data has not been updated with the newer key. Access to the keys in the inactive key repository 28 may be restricted, and the inactive keys in the repository 28 may not be available for export or access outside of being restored to the key manager 24.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where one or more processors may read and execute the code from one or more computer readable media. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, MRAMs, Flash Memory, firmware, programmable logic, etc.), etc. The code implementing the described operations may further be implemented in hardware logic in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, the key manager 24 was maintained on a key server 22 separate from the storage drive 2. In an alternative embodiment, the key manager and keystore may be implemented within code within the storage drive 2.

Operations described as performed by the key manager 24 may be performed by the keystore manager, and vice versa.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 2, 3, and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium including code executed to communicate with a key server and perform operations, the operations comprising:

maintaining active keys in an active area of a keystore, wherein at least one active key in the keystore is associated with at least one storage device and available for encrypting and decrypting data with respect to the associated at least one storage device;

loading the active keys from the active area of the keystore into a key manager to use to encrypt and decrypt data with respect to the storage devices associated with the active keys in response to an operation to load the keystore into the key manager;

receiving a request for an operation with respect to a specified active key that causes the specified active key to be removed as an active key from the keystore;

indicating the specified active key in the active area as inactive, wherein inactive keys are not available for use to encrypt and decrypt data;

removing the active keys indicated as inactive from the active area of the keystore;

copying the active keys indicated as inactive to an inactive key repository at the key server in response to indicating the active keys as inactive, wherein inactive keys indicated as in the inactive key repository are not available to use to encrypt and decrypt data with respect to the associated at least one storage device;

receiving a request to restore one of the inactive keys to the keystore to make available to decrypt and encrypt data for the at least one associated storage device associated with the requested inactive key; and indicating the requested inactive key to restore as active in the keystore, wherein a restored key and any other active key in the keystore associated with the at least one storage device with which the restored key is associated are available to be provided from the keystore to use to encrypt and decrypt data with respect to the at least one storage device with which they are associated.

2. The article of manufacture of claim 1, wherein the operations further comprise:

enabling export of active keys from one keystore, wherein the inactive keys in the inactive key repository are not enabled to be exported.

3. The article of manufacture of claim 1, wherein indicating the requested inactive key to restore as active comprises providing the key manager the requested inactive key to restore from the inactive key repository, wherein the key manager makes the requested inactive key available with other active keys maintained by the key manager.

4. The article of manufacture of claim 1, wherein the operations further comprise:

providing an expiration policy for the inactive key repository indicating a condition; determining the inactive keys in the inactive key repository that satisfy the condition of the expiration policy; and permanently deleting the determined inactive keys from the inactive key repository.

5. The article of manufacture of claim 1, wherein the requested operation with respect to the specified active key comprises an operation to add a new active key to replace the active key to remove, wherein the operations further comprise:

generating a new key to use for the at least one storage device associated with the active key to replace; and indicating the new key as active in the keystore for the at least one storage device for which the new active key is associated.

6. The article of manufacture of claim 1, wherein the requested operation that causes the active key to be removed comprises a request to delete the active key.

7. The article of manufacture of claim 1, wherein the operations further comprise:

determining that the inactive key to restore in the keystore has a same alias as a preexisting key in the keystore; and performing an operation in response to determining that the inactive key to restore has the same alias comprising one of the operations of overwriting the preexisting key having the same alias; failing the restore operation; and prompting for user action.

8. The article of manufacture of claim 1, wherein the operations further comprise:

receiving a user request to delete at least one indicated inactive key from the key repository; and permanently deleting the indicated at least one inactive key from the inactive key repository.

9. A computer implemented method, comprising maintaining active keys in an active area of a keystore in a computer readable storage medium, wherein at least one active key in the keystore is associated with at least one storage device and available for encrypting and decrypting data with respect to the associated at least one storage device;

loading the active keys from the active area of the keystore into a key manager to use to encrypt and decrypt data with respect to the storage devices associated with the active keys in response to an operation to load the keystore into the key manager;

receiving a request for an operation with respect to a specified active key that causes the specified active key to be removed as an active key from the keystore;

indicating the specified active key in the active area as inactive, wherein inactive keys are not available for use to encrypt and decrypt data;

removing the active keys indicated as inactive from the active area of the keystore;

copying the active keys indicated as inactive to an inactive key repository at a key server in response to indicating the active keys as inactive, wherein inactive keys indicated as in the inactive key repository are not available to use to encrypt and decrypt data with respect to the associated at least one storage device;

receiving a request to restore one of the inactive keys to the keystore to make available to decrypt and encrypt data for the at least one associated storage device associated with the requested inactive key; and indicating the requested inactive key to restore as active in the keystore, wherein a restored key and any other active key in the keystore associated with the at least one storage device with which the restored key is associated are available to be provided from the keystore to use to encrypt and decrypt data with respect to the at least one storage device with which they are associated.

10. The method of claim 9, further comprising:
enabling export of active keys from one keystore, wherein inactive keys in the inactive key repository are not enabled to be exported.

11. The method of claim 9, further comprising:
providing an expiration policy for the inactive key repository indicating a condition;
determining the inactive keys in the inactive key repository that satisfy the condition of the expiration policy; and
permanently deleting the determined inactive keys from the inactive key repository.

12. A system for managing keys for storage devices in communication with a key server, comprising:
a computer readable storage medium including a keystore having active keys in an active area of the keystore, wherein at least one active key in the keystore is associated with at least one of the storage devices and available for encrypting and decrypting data with respect to the associated at least one storage device;
a computer system including a key manager in communication with the keystore and enabled to perform operations, the operations comprising:
loading the active keys from the active area of the keystore into the key manager to use to encrypt and decrypt data with respect to the storage devices associated with the active keys in response to an operation to load the keystore into the key manager;
receiving a request for an operation with respect to a specified active key that causes the specified active key to be removed as an active key from the keystore;
indicating the specified active key in the active area as inactive, wherein inactive keys are not available for use to encrypt and decrypt data;
removing the active keys indicated as inactive from the active area of the keystore;
copying the active keys indicated as inactive to an inactive key repository at the key server in response to indicating the active keys as inactive, wherein inactive keys indicated as in the inactive key repository are not available to use to encrypt and decrypt data with respect to their associated at least one storage device;
receiving a request to restore one of the inactive keys to the keystore to make available to decrypt and encrypt data for the at least one associated storage device associated with the requested inactive key; and
indicating the requested inactive key to restore as active in the keystore, wherein a restored key and any other active key in the keystore associated with the at least one storage device with which the restored key is associated are available to be provided from the keystore to use to encrypt and decrypt data with respect to the at least one storage device with which they are associated.

13. The system of claim 12, wherein the key manager further performs:
enabling export of active keys from one keystore, wherein the inactive keys in the inactive key repository are not enabled to be exported.

14. The system of claim 12, wherein the key manager further performs:
providing an expiration policy for the inactive key repository indicating a condition; determining the inactive keys in the inactive key repository that satisfy the condition of the expiration policy; and
permanently deleting the determined inactive keys from the inactive key repository.

* * * * *